United States Patent
Hettel et al.

(10) Patent No.: US 6,318,702 B1
(45) Date of Patent: Nov. 20, 2001

(54) SHUTOFF DEVICE

(75) Inventors: Alfred Hettel, Bietigheim (DE); Axel Obermann, Rountzenheim (FR)

(73) Assignee: Siemens Building Technologies AG, Zurich (CH)

( * ) Notice: Subject to any disclaimer, the term of this patent is extended or adjusted under 35 U.S.C. 154(b) by 0 days.

(21) Appl. No.: 09/612,871

(22) Filed: Jul. 10, 2000

(30) Foreign Application Priority Data

Aug. 9, 1999 (DE) .............................. 199 37 627

(51) Int. Cl.⁷ .................................................. F16K 31/72
(52) U.S. Cl. .................................................. 251/64
(58) Field of Search .................................................. 251/64

(56) References Cited

U.S. PATENT DOCUMENTS

| 4,481,974 | * | 11/1984 | Schmitt et al. | 137/514 |
| 4,890,641 | * | 1/1990 | Gavrila | 137/514 |
| 5,039,060 | * | 8/1991 | Ross | 251/64 |

FOREIGN PATENT DOCUMENTS

| 4 97 032 | 11/1970 | (CH) . |
| 1 136 175 | 9/1962 | (DE) . |
| 19 77 658 | 1/1968 | (DE) . |
| 1 299 966 | 7/1969 | (DE) . |
| 66 10 392 | 11/1973 | (DE) . |
| 1 31 780 | 7/1978 | (DE) . |
| 43 32 117 A1 | 6/1995 | (DE) . |
| 198 03 896 A1 | 9/1998 | (DE) . |
| 197 43 081 A1 | 4/1999 | (DE) . |

* cited by examiner

*Primary Examiner*—John Fox
(74) *Attorney, Agent, or Firm*—Proskauer Rose LLP

(57) ABSTRACT

In a shutoff device, a shutoff body (2) is movable by a drive between abutments (1*a*, 5*b*). For the purposes of reducing noise and preventing so-called "valve chatter", a friction brake (6) is movable with the shutoff body (2) between control bodies (5*a*; 3*d*, 3*e*) at which the friction brake (6) arrives a friction distance (R1, R2) before the time at which the shutoff body (2) reaches each abutment (1*a*, 5*b*). The friction brake (6) rubs along a friction surface (3*a*; 8*a*) during the movement of the shutoff body (2) along the friction distance (R1, R2). (FIG. 1)

11 Claims, 2 Drawing Sheets

SHUTOFF DEVICE

BACKGROUND OF THE INVENTION

1. Field of the Invention

The invention relates to a shutoff device having a shutoff body which is movable by a drive between abutments.

2. Description of the Prior Art

Shutoff devices of that kind, including shutoff valves, which in particular are electromagnetically drivable, often give rise to noises in the opening and closing phases, such noises in many cases also being referred to as "valve chatter". Although the shutoff bodies, including valve plates or disks, often comprise a rubber-elastic material or are provided with a damping coating, it is often not possible to avoid such noises; they are passed in particular along the lines or conduits which they open or close, to locations at which such noises are perceived as being extremely troublesome and disturbing.

SUMMARY OF THE INVENTION

The object of the present invention, using simple means, is to avoid or at least substantially alleviate the production of noise upon actuation of such shutoff devices.

The invention provides a shutoff device having a shutoff body which is movable by a drive between abutments, and a friction brake which is intermittently movable with the shutoff body under the control of at least one control body with which the friction brake makes contact when the shutoff body still has to travel a respective friction distance to each abutment, wherein the friction brake rubs along a friction surface during the movement of the shutoff body along the friction distance.

Preferred configurations thereof are claimed in the dependent claims. Particularly preferred configurations are described with reference to the specific description.

The invention provides that a friction brake is movable with the shutoff body, the friction brake braking the movement of the shutoff body somewhat shortly before encountering the corresponding abutment, so that the shutoff body hits the abutment only with a reduced amount of force. The friction brake is therefore intended to come into operation in each case a friction distance before the moment in time at which the shutoff body reaches the abutment in question. The function of the friction brake is to rub along a friction surface as the shutoff body moves along the friction distance.

The friction surface can be formed for example by the stem of the shutoff body, which connects the latter to the drive. The friction surface can also be formed by the inside wall of a housing, with a drive body for the shutoff body being movable along the inside wall. The production of noise is determined by the particular dimensioning of the friction force between the friction brake and the friction surface, that is to say in particular by the material of the friction brake and surface nature of the friction surface. In many cases it is recommended that the friction surface be embodied by means of a thin coating on the unit in question.

The control body may be connected to the abutment for the shutoff body, in the opened position thereof. In another configuration according to the invention, the control body is connected to the shutoff body itself, in that case, the recommendation is for the drive body for the shutoff body to be provided with surfaces which act as control bodies.

In the simplest structure the friction brake can be in the form of a ring. Depending on the structural conditions involved however it is also possible to recommend using a friction brake which has two abutment flanges, in particular at the ends thereof.

The use of thermoplastic homopolymers, in particular polyoxymethylene (POM) is recommended as the material for the friction brake.

It is recommended that the drive has an electromagnetically operative armature as the electromagnetically actuable drive body. A spring may apply a counteracting force to the drive body so that, in the absence of actuation of the drive, the spring urges the shutoff body into the closed position against for example the valve seat, while to lift off and open the shutoff body, the electrical coil of the electromagnetic drive is energized so that the electromagnetic field of the coil moves the armature and at the same time pulls the shutoff body out of the closed into an opened position. The extent of the stroke movement involved in lifting of the shutoff body off the valve seat is limited by another abutment. In this embodiment, the closing force for the shutoff body is produced by the spring and the opening force is produced by the electromagnetic drive.

BRIEF DESCRIPTION OF THE DRAWINGS

Two preferred embodiments of the invention are diagrammatically set forth in greater detail hereinafter with reference to the drawings in which.

DESCRIPTION OF THE PREFERRED EMBODIMENTS

Figure 1:
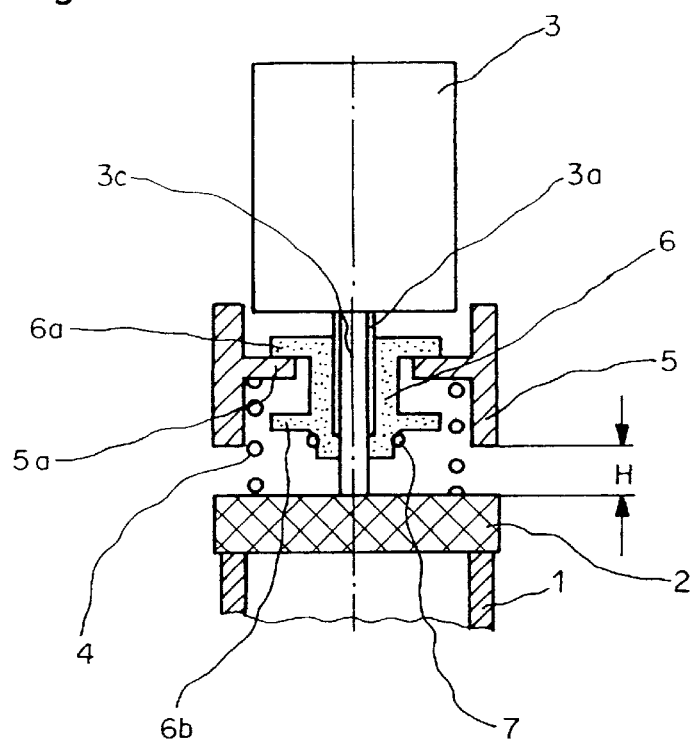
FIG. 1 is a diagrammatic view in cross-section through a shutoff device in the form of a shutoff valve, in the closed position.

Referring to FIG. 1, the shutoff body 2 is pressed against the edge of a line or conduit 1 by means of a coil spring 4 which produces the closing force and which bears against an annular hub of an abutment ring 5. The hub at the same time also forms a locking or control body 5a for the friction brake 6. In FIG. 1, in the closed position of the shutoff body 2, the upper abutment flange 6a of the friction brake 6 is pressed against the control body 5a, by virtue of the closing force of the spring 4. The cotton-reel-like friction brake 6 comprises thermoplastic homopolymers, in particular polyoxymethylene (POM), and is held fast at the lower end by means of a clamping ring 7 to the stem 3c of the shutoff body 2, which connects the latter to an armature 3 which is electromagnetically operative as a drive body. The stem 3c is surrounded by a coating which forms the friction surface 3a for the internal peripheral surface of the friction brake 6, as will be described hereinafter. The shutoff body 2 comprising a rubber-elastic member, for example rubber materials such as nitrile rubber (NBR), is movable by the stroke movement H from the closed position (FIG. 1) into the fully opened position (FIG. 3) by means of the armature 3 against the force of the spring 4. In the opened position the shutoff body 2 bears against the lower edge of the abutment ring 5, the edge serving as an abutment 5b for the shutoff body 2.

Figure 2:
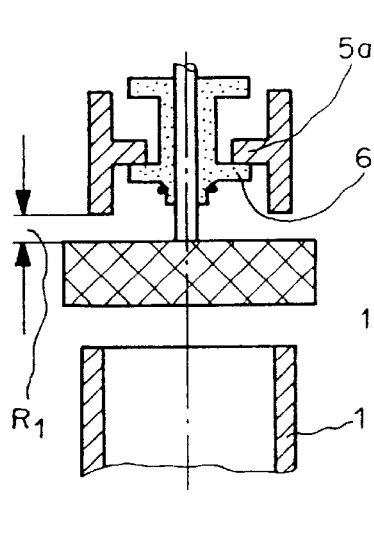
FIGS. 2, 3 and 4 show corresponding simplified diagrammatic views with the shutoff body in different positions.

In order to avoid noise in that situation, the friction brake 6, as shown in FIG. 2, comes into operation when the shutoff body 2 is still a friction distance R1 at a spacing from the abutment 5b. More specifically, at that moment the lower abutment flange 6b bears against the annular hub which serves as a control body 5a. If the friction brake 6 were non-displaceably connected to the stem 3c, then the shutoff body 2 could not reach its blocking position. In order to make that possible, the force of the drive body 3 urges the shutoff body out of the position shown in FIG. 2 into the position shown in FIG. 3. When that happens, the friction brake 6 rubs along the friction surface 3a, whereby the abutment forces of the shutoff body 2 against the abutment 5b are substantially reduced. By virtue of that travel of the shutoff body 2, which is to be covered over the last part of the motion involved, that is to say the stroke movement H, the drive force serves to overcome the additional friction force of the friction brake 6. As a result, it brakes the opening movement at the end of the travel distance involved and provides for damped "impact" of the shutoff body against the abutment.

Figure 3:
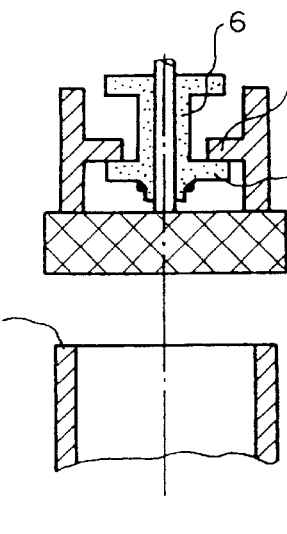
Figure 4:
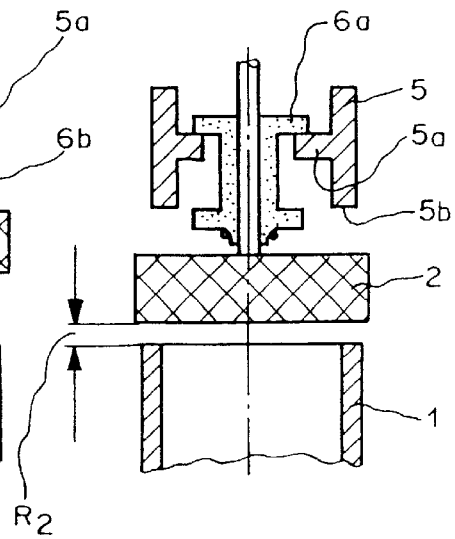

If the drive ceases to be operative, then the spring 4 urges the shutoff body 2 out of the position shown in FIG. 3 by way of the position in FIG. 4 back into the closed position of FIG. 1 again. Over that travel along the stroke movement H, shortly before the shutoff body 2 reaches the abutment 1a, once again a friction distance P2 is covered, in which the friction brake 6 comes into operation again, but this time in the reverse direction, when its upper abutment flange 6a has reached the control body 5a. Although a force which is "built up" by the kinetic energy of the armature is superimposed on the spring force of the spring 4, the frictional force of the friction brake opposes those forces and thereby damps impact against the valve seat.

In those cases in which the force of the spring 4 is of such a magnitude that it cannot be altered by the influence of the frictional force, the recommendation is for the friction surface to be of such a design configuration that the friction brake involves different conditions there (for example caused by different diameters). As a result the closing operation can be divided into three phases, more specifically into a first phase and a third phase in which the friction brake is not active, while in a phase therebetween the friction brake comes into operation.

Figure 5:
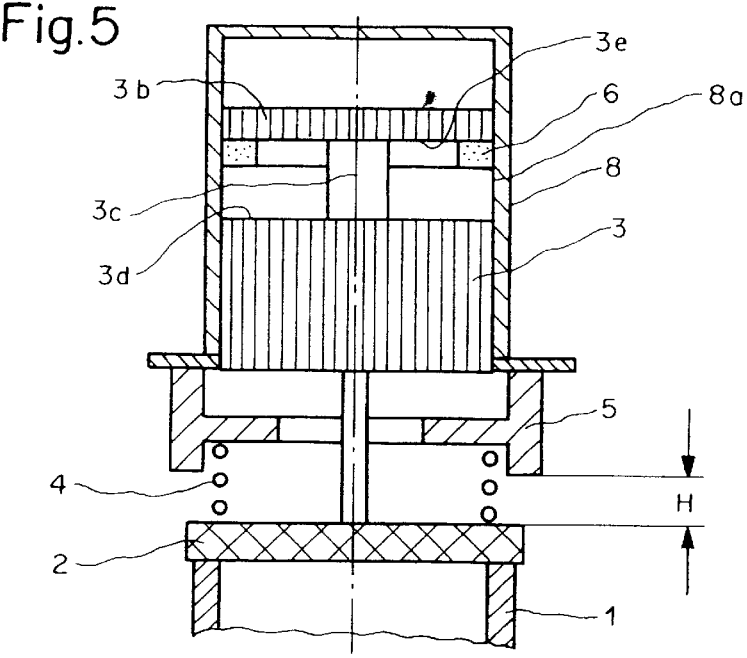
FIG. 5 is a diagrammatic view corresponding to FIG. 1 of another embodiment of the invention, also in the closed position.
Figure 6:
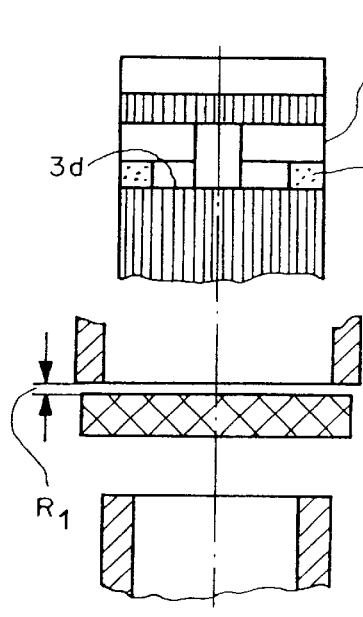
FIGS. 6, 7 and 8 show the shutoff body of FIG. 5 in different positions.
Figure 7:
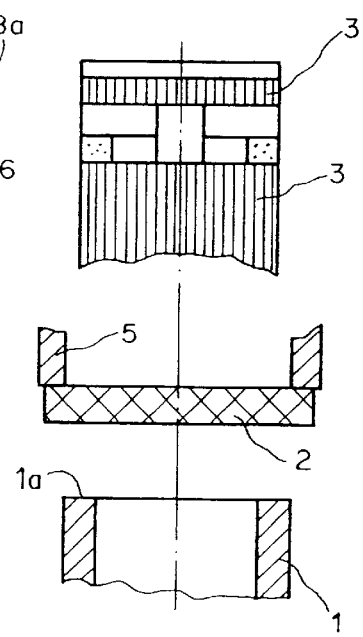
Figure 8:
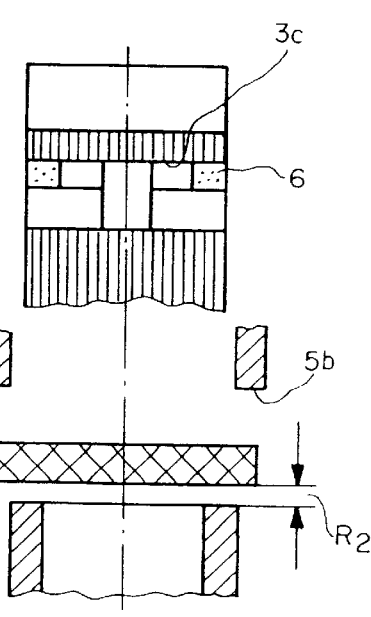

In the embodiment shown in FIG. 5 the annular friction brake 6 is disposed in the intermediate space between the main part of the cylindrical drive body 3 and a secondary part 3b which is likewise cylindrical and which is connected by way of the stem 3c thereto. The downwardly facing surface of the secondary part 3b serves as a control body 3e and the upper end face of the main part of the drive body 3 serves as a control body 3d for the friction brake 6 when it is moved along the friction surface 8a from the position shown in FIG. 5 by way of FIG. 6 into the position shown in FIG. 7 and from there back again by way of the position shown in FIG. 8 into the closed position of the shutoff body 2 shown in FIG. 5. The friction or rubbing action occurs between the cylindrical outside wall of the friction brake 6 and the cylindrical inside wall of the housing 8, the inside wall serving as the friction surface 8a. The spacing of the control bodies 3d and 3e and the thickness of the annular friction brake 6 determine the time at which the latter begins its function of braking or retarding the closing or opening movement.

We claim:

1. A shutoff device having a shutoff body which is movable by a drive between abutments, and a friction brake which is intermittently movable with the shutoff body under the control of at least one control body with which the friction brake makes contact when the shutoff body still has to travel a respective friction distance to each abutment, wherein the friction brake rubs along a friction surface during the movement of the shutoff body along the friction distance.

2. A shutoff device as set forth in claim 1, wherein the control body is connected to the abutment for the shutoff body in the opened position thereof.

3. A shutoff device as set forth in claim 1, wherein the control body is connected to the shutoff body.

4. A shutoff device as set forth in claim 2, wherein the friction surface is formed by a stem of the shutoff body or by a coating surrounding the stem, which connects the shutoff body to the drive.

5. A shutoff device as set forth in claim 3, wherein the friction surface is formed by an inside wall of a housing in which a drive body of the drive is movable therealong.

6. A shutoff device as set forth in claim 1, wherein the friction brake is in the form of a ring.

7. A shutoff device as set forth in claim 2, wherein the friction brake has two abutment flanges.

8. A shutoff device as set forth in claim 1, wherein the friction brake comprises thermoplastic homopolymers, in particular polyoxymethylene (POM).

9. A shutoff device as set forth in claim 3, wherein the drive has an electromagnetically operative armature as the drive body.

10. A shutoff device as set forth in claim 1, wherein a spring acts in opposition to the drive.

11. A shutoff device as set forth in claim 1, wherein the shutoff body is a rubber-elastic valve plate of a shutoff valve.

* * * * *